H. W. NICHOLS.
Flood-Fences.
No. 133,795.     Patented Dec. 10, 1872.
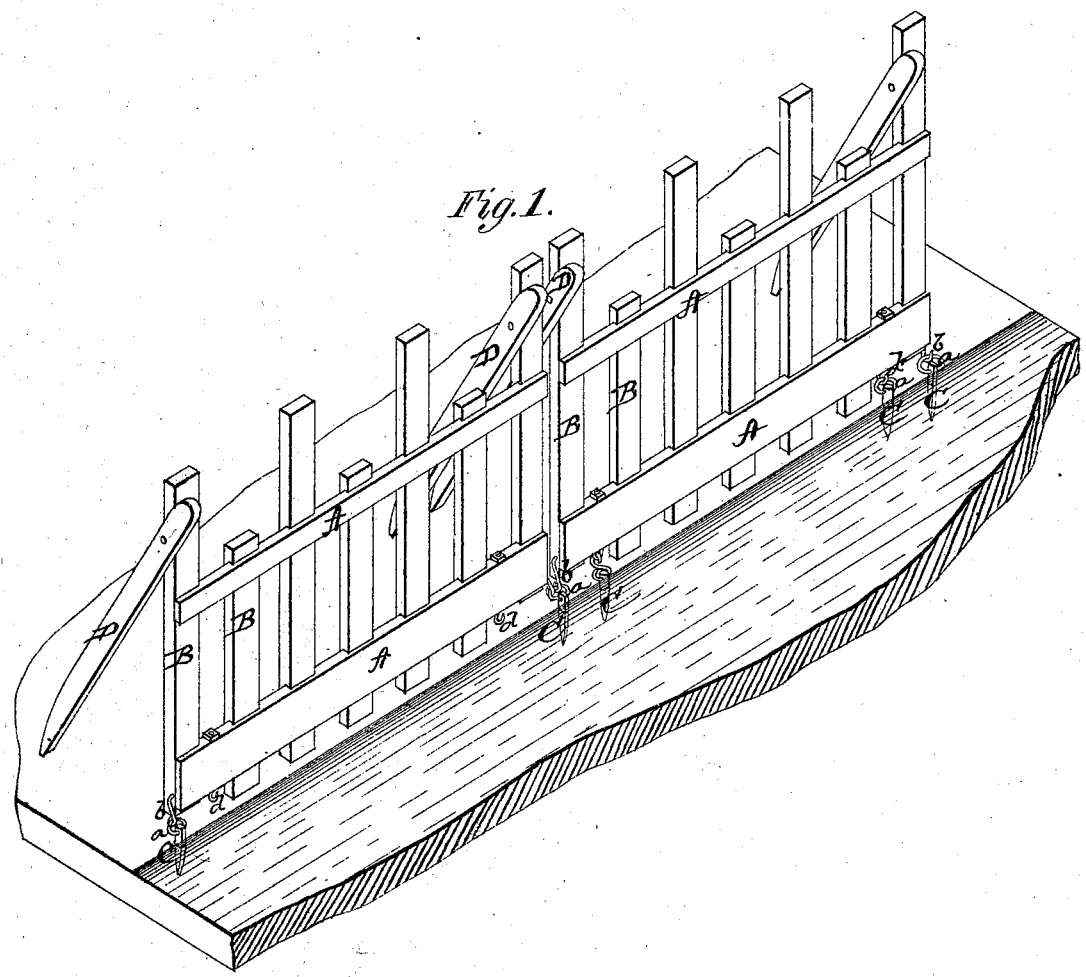
Witnesses
John A. Ellis
Wm. K. Ellis
Inventor
Henry W. Nichols
Per
T. H. Alexander & Co
Attys.

UNITED STATES PATENT OFFICE.

HENRY W. NICHOLS, OF NORTHFIELD, INDIANA.

IMPROVEMENT IN FLOOD-FENCES.

Specification forming part of Letters Patent No. 133,795, dated December 10, 1872.

*To all whom it may concern:*

Be it known that I, H. W. NICHOLS, of Northfield, in the county of Boone and State of Indiana, have invented certain new and useful Improvements in Flood-Gates; and I do hereby declare that the following is a full, clear, and exact description thereof, reference being had to the accompanying drawing and to the letters of reference marked thereon which form a part of this specification.

The nature of my invention consists in the construction and arrangement of a flood-fence and gate, as will be hereinafter more fully set forth.

In order to enable others skilled in the art to which my invention appertains to make and use the same, I will now proceed to describe its construction and operation, referring to the annexed drawing, in which—

Figure 1 is a perspective view of my flood-fence and gate, and Fig. 2 is a view of one of the fastenings used in the same.

My flood-fence is composed of two or more panels, each panel consisting of two horizontal bars A A, to which are attached upright slats B B. The alternate slats are shorter than the others, as shown, the short slats being high enough to prevent hogs from passing over, and the longer are still such a distance apart that they will prevent other animals from passing through.

The fence and gate are fastened in the following manner: At each end of the fence an iron stake, C, is driven firmly into the ground, and through the upper end of each stake is a ring, a. Into this ring hooks an elbow-hook, b, which passes through the end slat of the fence and is fastened by a nut. The adjoining ends of the panels may be fastened by the same means or by the means hereinafter described.

Between the ends each panel may be attached to one or more similar stakes, C, with rings a, by means of straight hooks d passing through the lower rail A, and also fastened by a nut.

So as to use only one stake, C, between the adjoining ends of two panels the ring a may be enlarged and both elbow-hooks b b hooked into the same, as shown in Fig. 1; or, in place of the ring a, I may use a rod, f, passed through the upper end of the stake and the ends turned across each other, as shown in Fig. 2, and the ends forming the hooks e e. In the end slats of the panels there should then be rings into which these hooks may catch.

It will be noticed that in all cases the hooks are open, so that either or all of the panels can readily be removed at any time without disturbing the stakes in the ground.

The fence is supported by braces D D, which may be attached to any of the slats B B.

Having thus fully described my invention, what I claim as new, and desire to secure by Letters Patent, is—

1. The flood-fence A B fastened to the ground by means of stakes and open hooks so as to be readily removed without disturbing the stakes, substantially as and for the purpose set forth.

2. The stake C, the rod f, the ends of which form the hooks e e, in combination with the elbow-hooks b and fence A B, all constructed and arranged as and for the purpose set forth.

In testimony that I claim the foregoing as my own I hereunto affix my signature in presence of two witnesses.

HENRY W. NICHOLS.

Witnesses:
W. H. HALLSTED,
I. F. STEPHENSON.